Dec. 18, 1962    R. F. BERNDT    3,069,284
PROCESS AND APPARATUS FOR PRODUCING RAISED
IMPRESSIONS ON MATRICES
Filed Nov. 27, 1959    2 Sheets-Sheet 1
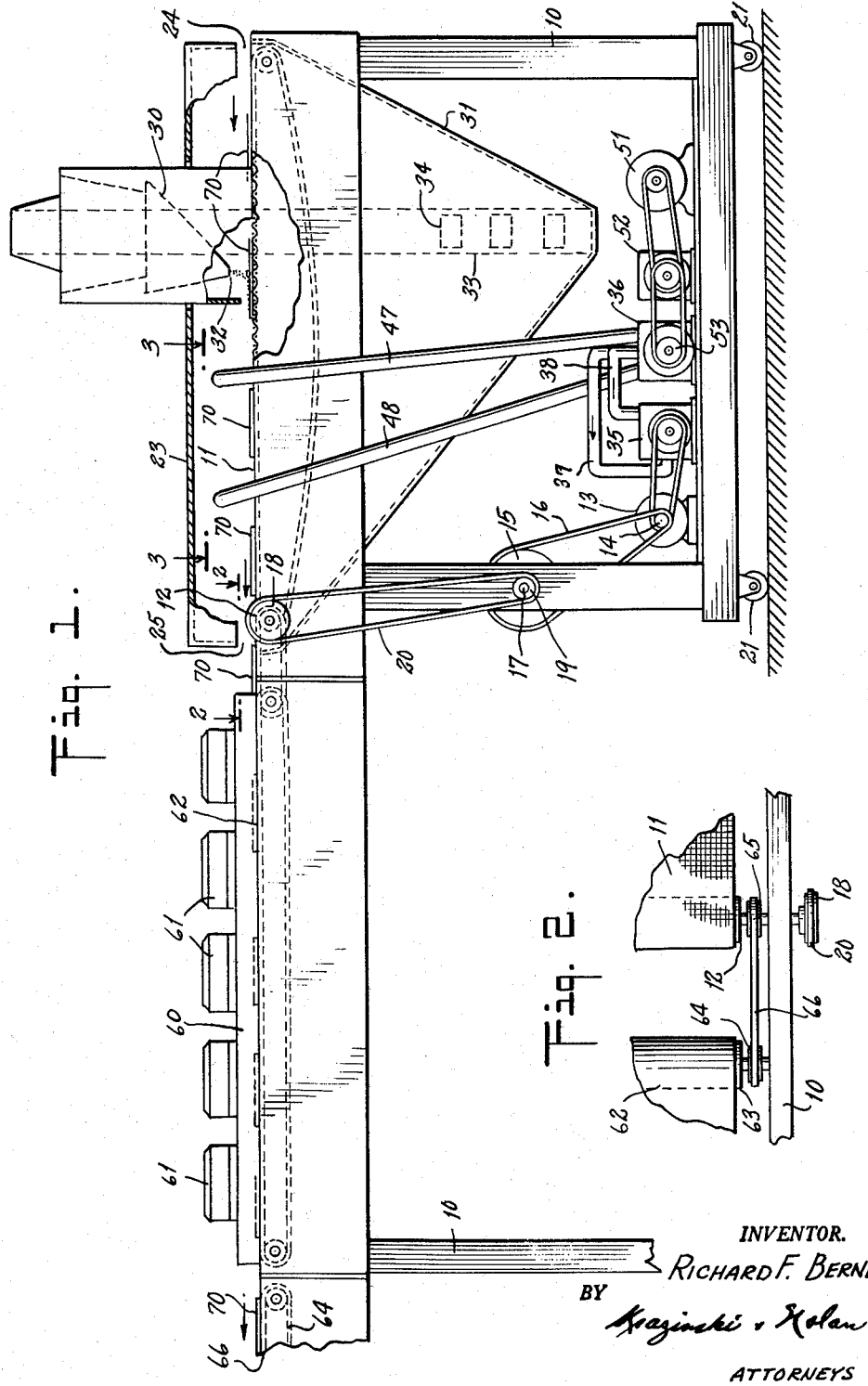
INVENTOR.
RICHARD F. BERNDT
BY
ATTORNEYS Dec. 18, 1962  R. F. BERNDT  3,069,284
PROCESS AND APPARATUS FOR PRODUCING RAISED
IMPRESSIONS ON MATRICES
Filed Nov. 27, 1959  2 Sheets-Sheet 2
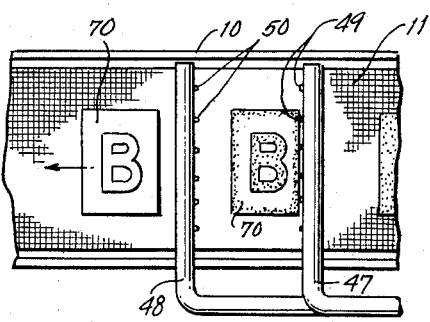
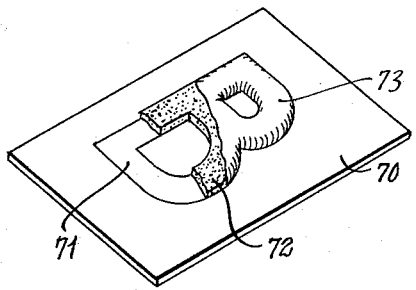
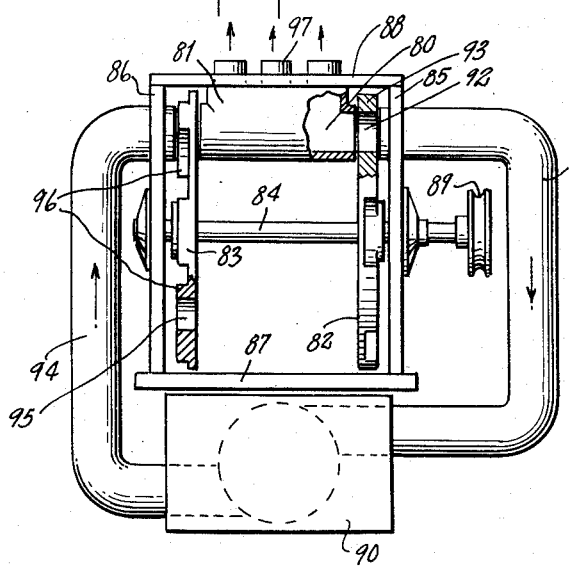
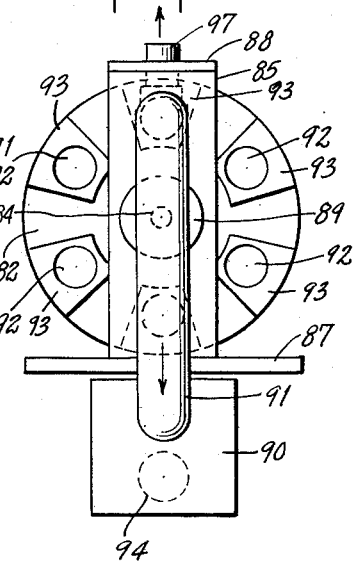
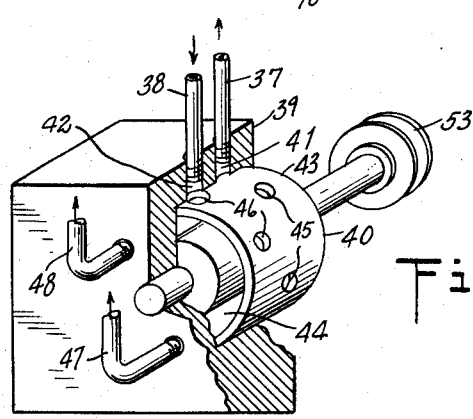
INVENTOR.
RICHARD F. BERNDT
BY
ATTORNEYS 3,069,284
PROCESS AND APPARATUS FOR PRODUCING RAISED IMPRESSIONS ON MATRICES
Richard F. Berndt, South Plainfield, N.J., assignor to Virkotype Corporation, Plainfield, N.J., a corporation of New Jersey
Filed Nov. 27, 1959, Ser. No. 855,922
4 Claims. (Cl. 117—13)

This invention relates to processes and apparatus for producing raised impressions on matrices.

In the production of raised impressions on matrices, such as in the manufacture of raised printing, particles are applied on a matrix, such as paper, cloth, other cellulosic materials, plastics, ceramics and metals. In one commonly used system, the particles adhere to an adhesive on the surface of a matrix, and the excess particles on the matrix are removed by reduced pressure.

The practice of removing the excess particles in such a system by use of reduced or sub-atmospheric pressure has many disadvantages. One disadvantage is that air currents necessary to lift the surplus particles from the matrix cause a further subdivision of the particles. Again, the high speed air currents produce a high rate of triboelectrification (static) on the particles that results in poor flow, building up and avalanching of the particles. Finally, relatively elaborate means are required to contain the particles in the apparatus by removing the particles out of the air stream resulting from the use of the reduced pressure.

In accordance with this invention, particles used in the production of raised impressions on matrices are removed and recovered without further subdivision of the particles, without building up significant triboelectrification and without the use of the elaborate means for containing the particles within the apparatus. The invention comprises the step of contacting with a vibrating gaseous medium such as vibrating air, a matrix having an adhesive impression and particles unadhered to the adhesive. The vibrating gaseous medium vibrates the matrix and unadhered particles to sweep the unadhered particles and remove them from the matrix.

In the practice of the invention, an adhesive, such as ink or other tacky material, may be applied to the surface of a matrix and particles may then be distributed over the surface while the adhesive is still wet or tacky. The adhesive impression may be produced by triboelectrification such as in xerography or by any other means. A gaseous medium is vibrated, desirably within the range of 30 to 300 cycles per second, and the surface of the matrix with the particles distributed thereon is contacted with the vibrating gaseous medium. The vibrating medium quickly removes the surplus, unadhered particles from the surface. The particles vibrate, dance over the surface of the matrix and are readily swept off the matrix without coherence or material friction between the particles. As a result of the vibrations of the particles and the matrix, cavitation is reduced, thereby allowing the particles to pack more closely on the adhesive. The surplus powder is collected and may be recycled for distribution on other adhesive surfaces. For certain uses, the resulting surface having the particles adhered to the adhesive and with the surplus particles removed may be heated to effect the coalescing or fusing of the particles with the adhesive.

Apparatus for producing raised impression on matrices in accordance with this invention includes discharge means for discharging particles on the surface of a matrix containing an adhesive impression and means for applying a vibrating gaseous medium to the matrix to remove the unadhered particles from the surface of the matrix. Means may also be provided for producing a vibrating gaseous medium. This latter means may be any type of vibrating gaseous generating device, such as a transducer utilizing, for example, a piezo-electric crystal, a magneto-striction rod, a core and coil or a core, a permanent magnet and coil. Again, the device for producing the vibrating gaseous medium may be pneumatic, such as that involving the alternate use of pressures above and below atmospheric. Means are also desirably provided in the apparatus for collecting the removed particles and for recycling them for application on adhesive impressions on other matrices.

An object of this invention is to produce raised impressions on matrices economically and efficiently.

A more particular object of the invention is to produce raised impressions on matrices by the utilization of acoustical vibrations in the removal and recycling of the surplus of the particles used in such production with substantial reductions of cavitation of the adhered particles and without further subdivision of the recovered particles.

A more comprehensive understanding of this invention is obtained by reference to the accompanying drawings, in which:

FIG. 1 is a side elevation, partly broken away, of apparatus for the production of raised printing embodying the invention;

FIG. 2 is a plan view of a portion of the apparatus shown in FIG. 1, as viewed along the arrows 2, 2 of FIG. 1;

FIG. 3 is a plan view of a portion of the apparatus shown in FIG. 1, as viewed along the arrows 3, 3 of FIG. 1;

FIG. 4 shows a matrix and the raised impression on it produced by the apparatus of FIG. 1;

FIG. 5 shows the acoustical generator of FIG. 1;

FIGS. 6 and 7 are front and side elevations, respectively, of an alternate acoustical generator from that shown in FIG. 5.

The apparatus, as shown in FIGS. 1 through 5, consists of a frame 10 which supports a front conveyor 11 in the form of an open wire mesh endless belt. The belt is rotated in a counter clockwise direction by a driving roller 12 driven by any suitable means such as a motor 13 through a chain and sprocket assembly and pulleys 14 and 15 connected by a belt 16, the pulley 14 being fixedly attached to the shaft of the motor 13 and the pulley 15 being fixedly attached to a shaft 17. The chain and sprocket assembly include sprocket 18 fixedly attached to and rotatable with the shaft of the driving roller 12. A sprocket 19 fixedly attached to the shaft 17 and rotatable with the pulley 15 is connected to the sprocket 18 by a chain 20. A vari-speed device may be interposed between the motor 13 and the pulley 15 to vary the speed of the conveyor belt 11, as desired. The frame 10 may be supported by swivel castor 21 to permit the apparatus to be moved to different locations easily.

A device for the distribution of powder on a matrix of the raised printing apparatus includes a dispensing hopper 30 which contains the powder or finely diveded particles and a collecting hopper 31. The dispensing hopper is provided with an elongated orifice 32 capable of discharging finely divided particles in a steady stream to cover with the particles matrices on the conveyor 11 as they pass under the orifice 32. The finely divided particles collected in the collecting hopper 31 are returned to the dispensing hopped 30 by bucket elevators 34 contained in a pipe 33. Means of conventional type are desirably provided for regulating the rate of or stopping the flow of powder through the orifice 32.

The powder which does not adhere to the matrix is removed by acoustical vibrations produced by any suitable sonic generator system. The system embodied in the apparatus shown in FIG. 1 includes a dual pump 35 which consists of a vacuum pump and an air pressure pump, both of which are rotated by the electric motor 13. The vacuum pump of the dual pump 35 is connected through a conduit or pipe 37 to a sonic generator 36, while the air pressure pump of the dual pump 35 is connected to the sonic generator 36 through a conduit or pipe 38. A hood 23 having openings 24 and 25 for the passage of the matrices extends the length of the conveyor 11 and around the dispensing hopper 30 and functions to contain the particles within the system and insure that free particles are substantially completely returned to the collecting hopper 31.

The sonic generator 36 shown in FIG. 5 consists of a stator 39 and a rotor 40 rotatable by means of a pulley 53. Two ports 41 and 42 are provided in the stator 39. The conduit 37 is connected to port 41, while the conduit 38 is connected to port 42. A cylinder 43 of the rotor 40 forms a chamber 44 with the stator 39.

The revolving cylinder 43 is equipped with two sets of holes 45 and 46. Each of the holes 45 is aligned on the periphery of the cylinder 43 with the port 41 and each hole 45 is capable when contacting the port 41 of opening that port to the chamber 44. In the same manner, each of the holes 46 is aligned with the port 42 to open and close port 42 to chamber 44. The holes of each set are staggered from those of the other set so that when the rotor 43 is revolved, a pulsating acoustical vibration is produced in the chamber by the introduction into chamber 44 of air alternately at relatively low and high pressures. For many applications, it is desirable to insure the containment of the particles within the apparatus. For this purpose, the low and high pressures should approach equilibration, and for some situations, the differential between the atmospheric and low pressure should be slightly greater than the differential between the high pressure and the atmospheric. These acoustical vibrations are transmitted through one or a plurality of conduits 47, 48, which terminate in a series of small orifices or single slots 49 and 50 for the emission of the acoustical vibrations to a powder covered matrix passing along the conveyor belt 11. The pulley 53 of the rotor 40 of the sonic generator is driven by an electric motor 51 through a vari-speed device 52. The number of pulsations per second is controlled by the vari-speed device 52. The vari-speed device may be any suitable conventional type of instrumentality for varying the rate of rotation of the rotor 40 of the sonic generator and may be adjusted to obtain the desired pulsation of gaseous medium per second.

In the production of raised printing, means are usually provided to coalesce or fuse the powder with the adhesive impression on the matrix. In the apparatus shown in FIG. 1 this means comprises on elongated, desirably heat insulated chamber 60 having a single or a plurality of heat generators 61, such as electric or gas operated heaters. An endless open wire conveyor belt 62 passes through the chamber 60. The belt 62 is rotated in a counter clockwise direction by a driving roller 63 rotated by a sprocket and chain assembly consisting of sprocket 64 fixedly attached to and rotatable with the shaft of the driving roller 63, sprocket 65 fixedly attached to and rotatable with the shaft of sprocket 18, and chain 66 connecting sprockets 64 and 65. The conveyor belt 62 picks up the matrices at the end of their journey over conveyor belt 11 and carries them through the length of heating chamber 60. An additional endless conveyor belt 64, partially shown in FIG. 1, and operated by a source not shown serves to pick up and transport the matrices after their passage through the heating chamber 60 for additional operations, such as passage through a cooling chamber or stacking the finished raised printed matrices.

In the operation of the apparatus shown in FIGS. 1, 2, 3, and 5, a matrix 70 having an inked impression 71 as shown in FIG. 4 is placed on the right hand end of the conveyor 11 before passage under the dispensing hopper 30. A conveyor, not shown, may be employed for supplying the matrices having the impressions thereon to the conveyor 11. The impressions on the matrices may be effected by any suitable means, such as the conventional printing press in which the ink is applied to each matrix. When the matrix 70 passes under the dispensing hopper 30, the powder continually passing from the orifices of the hopper 30 substantially completely covers the matrix 70. The powder not retained on the surface of the matrix 70 passes through the open wire meshes of the conveyor 11 to the collecting hopper 31 and through the return pipe 33 and elevator buckets 34 to the dispensing hopper 30 to be distributed on other matrices passing under the orifices 32. The powder as shown in FIG. 4 and represented by the numeral 72 adheres to the ink 71 on the matrix 70. The conveyor 11 in its movement to the left as shown in FIG. 1 brings the powder covered matrix under the series of orifices or single slots 49 and 50 of the conduits 47 and 48 to contact the matrix and the powder on it with the vibrating air transmitted from the orifices. The vibrating air quickly removes the surplus, unadhered powder from the surface of the matrix. In addition, the vibration of the matrix results in reduction of cavitation of the powder on the inked surface by packing significantly more particles on the inked impression than presently used commercial methods. The surplus, unadhered powder passes through the open meshes of the conveyor 11 to the collecting hopper 31 to be returned through the pipe 33 which contains the bucket elevators 34 to the dispensing hopper 30. The only powder retained on the matrix is that which adheres to the printed impression as represented by the powder 72 on the printed ink impression in FIG. 4. The matrix with the adhered powder on the printed impression passes to the end of the conveyor 11 to be picked up by the conveyor 62 for passage through the heating chamber 60. During its passage through the chamber 60 the ink and adhering powder on the matrix coalesce or fuse to produce a raised impression on the matrix as shown by the numeral 73 in FIG. 4. After passage through the chamber, the matrix with the raised impression on it is transferred from the end of the conveyor 62 to the conveyor 64 for any additional processing, such as cooling or stacking.

FIGS. 6 and 7 show another type of sonic generator which may be employed in the apparatus of this invention. This generator comprises a stationary chamber 80 formed by a casing 81 and two rotatable discs 82 and 83. The rotatable discs 82 and 83 are mounted on a common shaft 84 which is rotatable in fixed vertical supports 85 and 86 of the frame of the generator. The two vertical members are supported on a horizontal base 87 and are joined at the top by a horizontal member 88. The discs 82 and 83 are rotated by an electric motor or other rotating means through a pulley 89 fixedly attached to the shaft 84. A pump 90 supplies a reduced pressure and a pressure above atmospheric required for producing the pulsating vibration of the sonic generator. The inlet or vacuum side of pump 90 is connected to a pipe 91 which is adapted to be aligned to any one of a plurality of holes 92 through the disc 82 and one of a plurality of elevations 93 spaced at intervals around the surface of the disc 82. When the pipe 91 is so aligned to any one of the holes 92, it forms a passage from the vaccum or inlet side of the pump 90 to the chamber 80. In like manner, the outlet or pressure side of the pump 90 is connected through a pipe 94 which is adapted to be aligned with any one of a plurality of holes 95 through the disc 83 and one of a plurality of elevations 96 spaced at intervals around the surface of the disc 83. When the pipe 94 is so aligned to any one of the holes 95, it forms a passage from the outlet or air pressure side of the pump 90 to the chamber 80. The set of holes 92 of the disc 82 are staggered from the set of holes 95 of the disc 83 so that at no time can the chamber 80 have a passage to both the inlet and outlet sides of the vacuum pump 90. Each of the elevations 93 of disc 82 comprises desirably an arc of sufficient dimensions so that when a hole 92 is aligned with pipe 91 and the opening of the stationary chamber 80 adjacent the disc 82, a substantially air tight passage is effected for withdrawal of air from the chamber 80 through the pipe 91 to the vacuum side of the pump 90. When a hole 92 is so aligned with pipe 91, none of the elevations 96 on disc 83 is in contact with pipe 94 and therefore a free passage of air is afforded from chamber 80 through pipe 91, through the inlet side of the vacuum pipe 90, through pipe 94 and the opening thereof to the atmosphere. When none of the holes 92 is aligned with the opening of pipe 91, the opening of the chamber 80 adjacent the disc 82 is completely closed by the disc 82, but pipe 91 is open to the atmosphere because its opening is not in contact with an elevation 93. The opening of pipe 91 to the atmosphere permits air to be drawn from the atmosphere to the inlet or vacuum side of pump 90 and thereby to supply from the atmosphere the air under pressure required for the outlet side of the pump 90. The elevations 96 on the disc 83 are constructed in a similar manner to that of the elevations 93 of disc 82. When a hole passing through the disc 83 and an elevation 96 thereof is aligned with the opening of pipe 94 and the opening in chamber 80 adjacent to the disc 83, a substantially air tight passage is available from the outlet or air pressure side of the pump 90 through the pipe 94 to the chamber 80 and air under pressure passes from the pump 90 to the chamber 80.

The chamber 80 has a plurality of ports 97 through which the acoustical vibrations are transmitted. These ports may be connected through conduits or pipes to remove unadhered powder from matrices in the same manner that the sonic generator shown in FIG. 5 functions by passage of acoustical vibrations through pipes 47 and 48. One or more of these ports may be closed by taps and these taps may be removed or replaced with pipes when needed for the application of acoustical vibrations for the removal of unadhered powder from matrices on the same or different raised printing apparatus.

When the shaft 84 of the sonic generator shown in FIGS. 6 and 7 is rotated, the vacuum pump 90 operates to withdraw air from the atmosphere and apply air under pressure to the chamber 80. This action creates an alternating pulsating acoustical vibration in the chamber 80 which may be directly transmitted through pipes from the ports 97 to a matrix passing along the conveyor 11 in the same manner that the acoustical vibrations pass through the conduits 47 and 48 and the orifices 49 and 50 to remove the unadhered powder from the matrix as shown in FIGS. 1, 3 and 4. The holes and elevations on discs 82 and 83 are positioned so that only one hole is aligned with an opening of the chamber 80 at any one time and that during the alignment of one hole with an opening of the chamber 80 the other opening of the chamber 80 adjacent a disc is substantially completely closed so that no significant effect of the withdrawal or supplying of air is lost. During the period in which a hole of one of the discs is aligned with an opening of the chamber 80, the other disc is so positioned that the opening of its respectively associated pipe 91 or 94, as the case may be, is out of complete contact with an elevation of the disc so that such opening is in contact with the atmosphere to withdraw air therefrom or force air thereinto. This arrangement permits the utilization of a single vacuum pump for producing the pulsating acoustical vibrations without need of a separate chamber for air at reduced pressure and another chamber for air under pressure.

The embodiment of the invention described is illustrative and is not to be construed as any limitation of the invention. For example, any sonic generator which is capable of producing pulsating or alternating vibration of a gaseous medium could be utilized instead of the generator shown in FIG. 5 or FIGS. 6 and 7. For example, a magneto-striction transducer could be employed for this purpose. For must purposes, a frequency of 30 to 300 cycles per second is satisfactory. While vibrating air is ordinarily the gaseous medium employed for the removal of surplus particles, other gases, such as nitrogen, may be used for situations requiring special conditions, such as a non-oxidizing atmosphere. Again, while particles comprising powder which is coalesced by the heat with the adhered ink are described, entirely different types of particles with different adhesives may be used which do not coalesce with heat, such as those involved in the oxidation of drying oils or the polymerization of monomers. In such situations, no heaters are required.

What is claimed is:

1. Apparatus for producing a raised impression on a matrix which comprises conveying means for moving a matrix having an adhesive impression on a surface thereof, discharge means for discharging particles on the impression-containing surface of a matrix, sweeper means in the path of said conveying means having nozzles above the surface of the matrix and directed toward the matrix, positive gas supply means for supplying gas under positive pressure, subatmospheric gas pressure means for creating a subatmospheric gas pressure and means for alternately connecting said positive gas supply means and said subatmospheric pressure gas means to said nozzles.

2. Apparatus for producing a raised impression on a matrix which comprises conveying means for moving a matrix having an adhesive impression on a surface thereof, a discharge means for discharging particles on the impression-containing surface of a matrix, sweeper means in the path of said conveying means having nozzles above the surface of the matrix and directed toward the matrix, positive gas supply means for supplying gas under positive pressure, subatmospheric gas pressure means for creating a subatmospheric gas pressure, means for alternately connecting said gas supply means and said subatmospheric gas pressure means to said nozzles, collecting means for collecting the removed, swept surplus particles and means for recycling said surplus particles from said collecting means to said discharge means.

3. Apparatus for producing a raised impression on a matrix which comprises conveying means for moving a matrix having an adhesive impression on a surface thereof, discharge means for discharging particles on the impression-containing surface of a matrix, sweeper means in the path of said conveying means having nozzles above the surface of the matrix and directed toward the matrix, positive gas supply means for supplying gas under positive pressure, subatmospheric gas pressure means for creating a subatmospheric gas pressure, means for alternately connecting said positive gas supply means and said subatmospheric gas pressure means to said nozzles, and means for heating the matrix to coalesce the adhered particles and said adhesive.

4. The process for producing a raised impression on a matrix which comprises passing a matrix having an adhesive impression thereon over an area, distributing particles on said matrix in its passage over said area, directing blasts of a gaseous medium over a narrow area of said matrix, interrupting said blasts and applying a suction at the same point and repeating said cycle of blasts and suction.

(References on following page)

References Cited in the file of this patent

UNITED STATES PATENTS

| | | |
|---|---|---|
| 1,144,303 | Lipsius | June 22, 1915 |
| 1,966,907 | Schneider | July 17, 1934 |
| 2,130,605 | Stande | Sept. 20, 1938 |
| 2,175,272 | Lipsius | Oct. 10, 1939 |
| 2,188,901 | Hyatt et al. | Feb. 6, 1940 |
| 2,704,333 | Calosi et al. | Mar. 15, 1955 |
| 2,748,298 | Calosi et al. | May 29, 1956 |
| 2,748,746 | Wommelsdorf | June 5, 1956 |
| 2,838,023 | Jaime | June 10, 1958 |
| 2,917,021 | Barkstrom | Dec. 15, 1959 |